United States Patent [19]

Athalye

[11] Patent Number: 4,667,177

[45] Date of Patent: May 19, 1987

[54] BRAKE LIGHT SIGNAL SYSTEM FOR A MOTOR VEHICLE

[76] Inventor: Ravindra G. Athalye, 20702 El Toro Rd., #191 Phesant Creek, El Toro, Calif. 92360

[21] Appl. No.: 813,493

[22] Filed: Dec. 26, 1985

[51] Int. Cl.$^4$ .............................................. B60Q 1/26
[52] U.S. Cl. ...................................... 340/71; 340/72; 340/66
[58] Field of Search ...................... 340/71, 72, 69, 66, 340/67, 74, 669; 307/10 LS

[56] References Cited

U.S. PATENT DOCUMENTS

| | | | |
|---|---|---|---|
| 3,320,586 | 5/1967 | Wagner | 340/71 |
| 3,440,603 | 4/1969 | Cochran | 340/66 |
| 3,665,391 | 5/1972 | Bumpous | 340/72 |

*Primary Examiner*—Donnie L. Crosland
*Attorney, Agent, or Firm*—Jack C. Munro

[57] ABSTRACT

A brake light signal system for a motor vehicle which utilizes a plurality of different colored lights which are to be visually observed by individuals located rearward of the motor vehicle. As in increasing amount of braking force is applied, a different colored light is activated to thereby indicate to the individuals located to the rear of the motor vehicle whether only a slight amount of braking force is being applied, or whether a medium amount of braking force is being applied, or a severe amount of braking force is being applied. The actuation of the brake light signal system is made nearly independent of vehicle inclination from the horizontal either due to road gradient or suspension non-uniformity.

17 Claims, 6 Drawing Figures

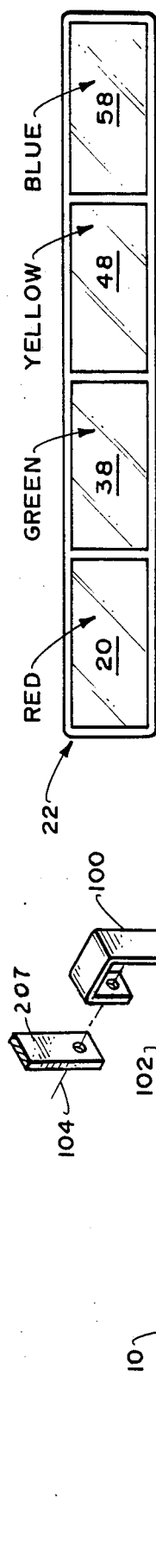
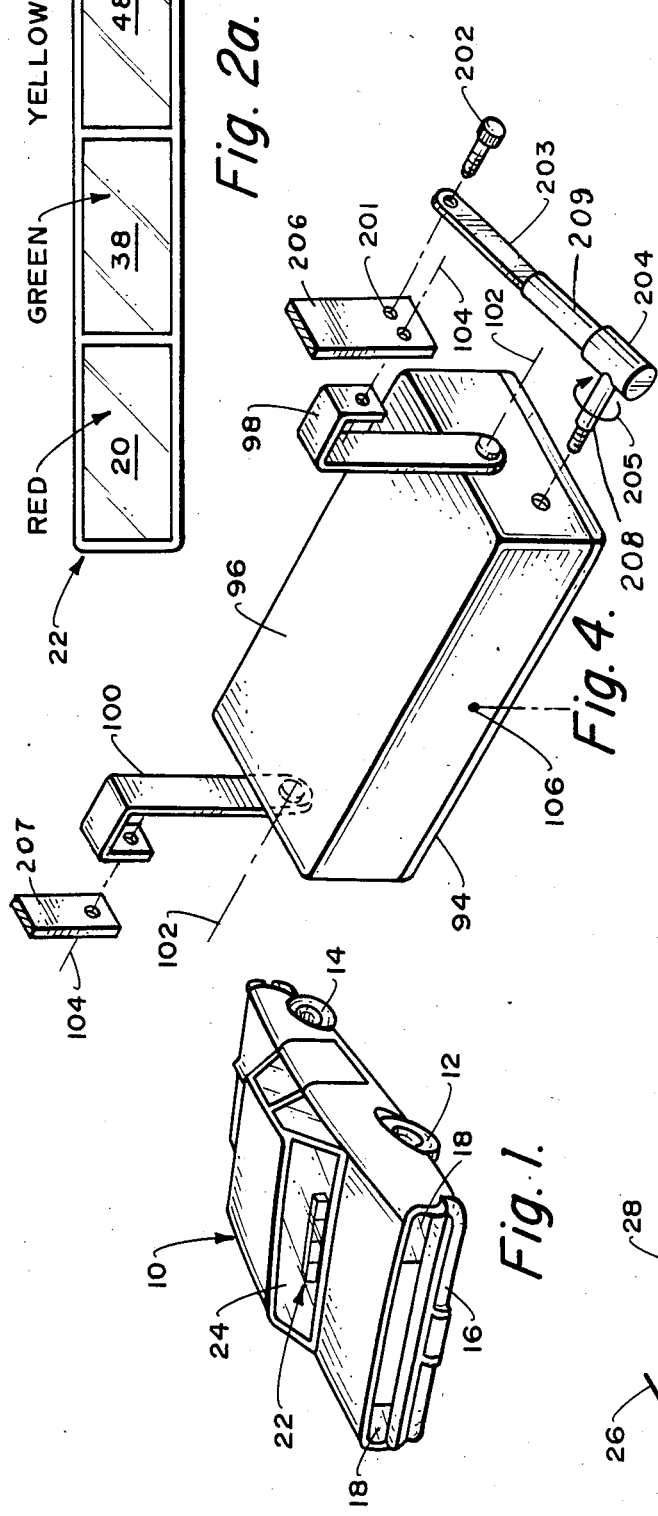
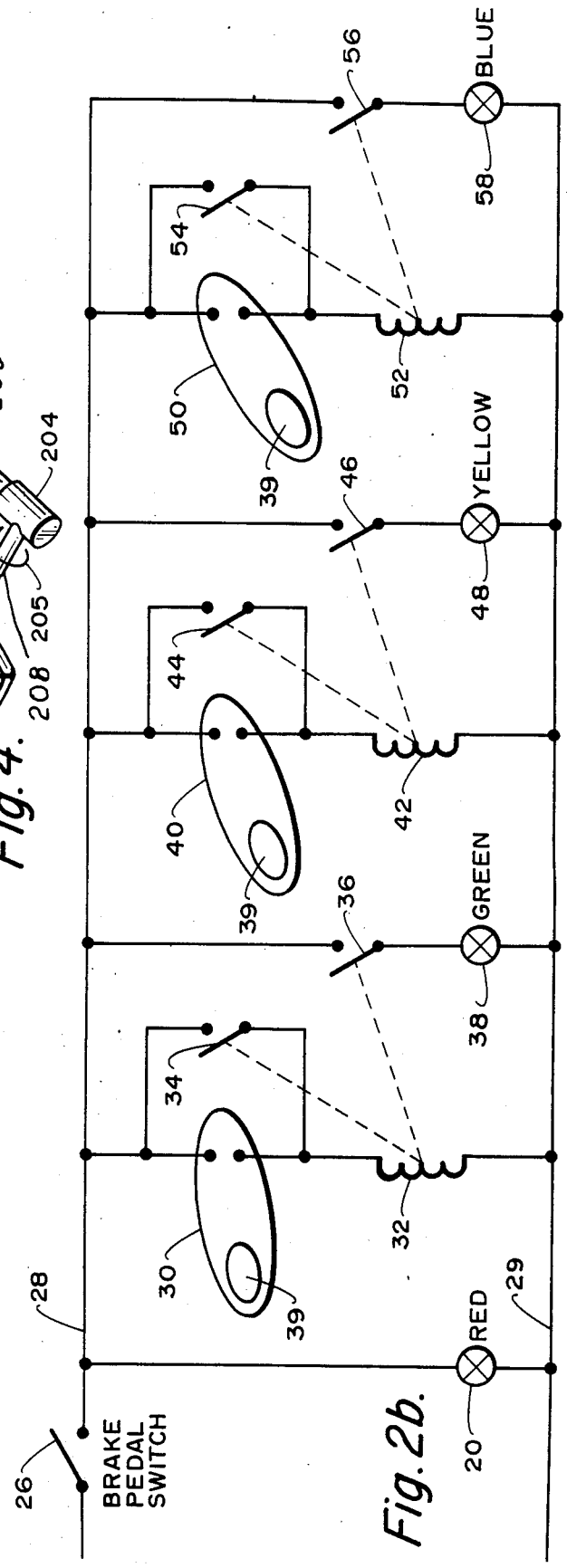

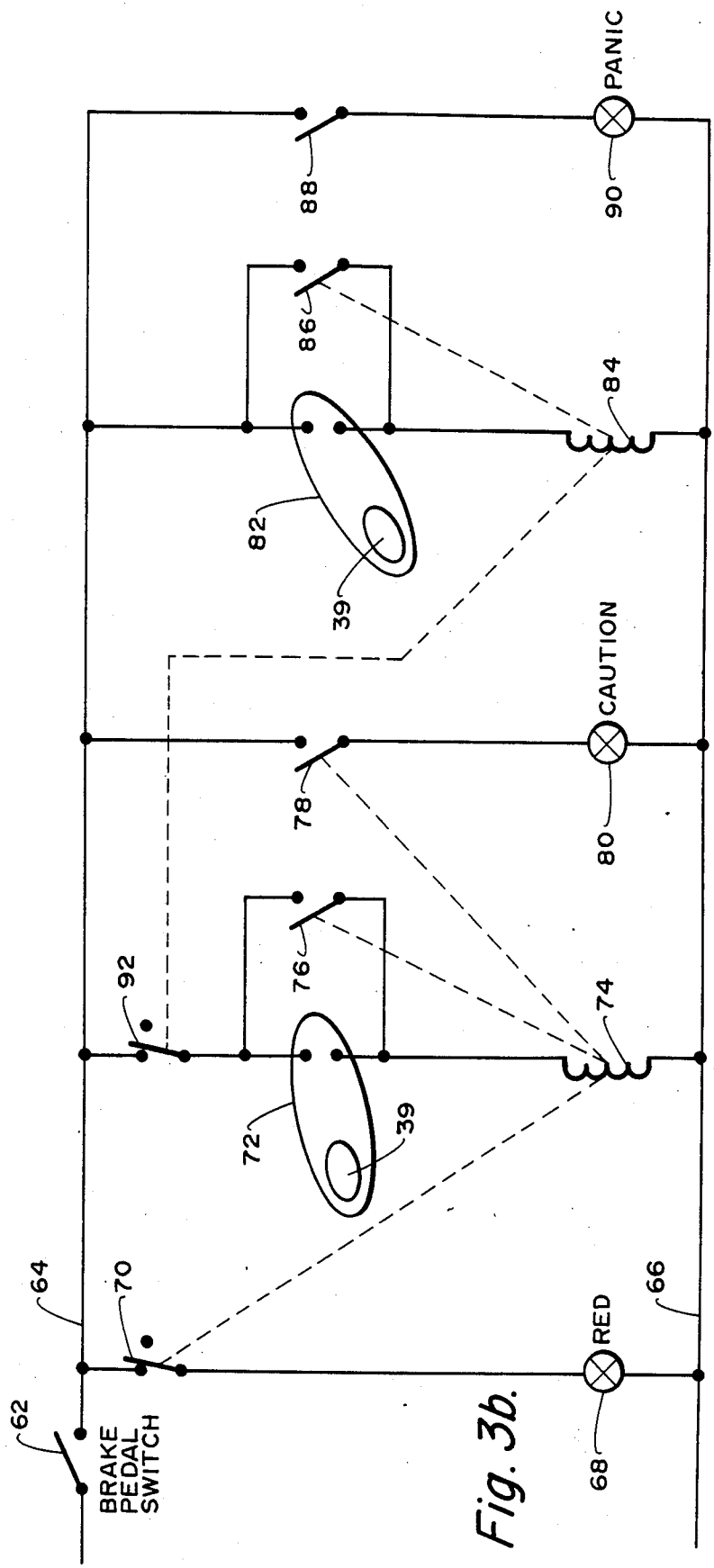

BRAKE LIGHT SIGNAL SYSTEM FOR A MOTOR VEHICLE

BACKGROUND OF THE INVENTION

The subject matter of this invention relates to a vehicle signaling system, and more particularly to a lighting system for advising motorists following a motor vehicle that a vehicle is being decelerated to give to those motorists an indication of how severe the motor vehicle is being decelerated.

During the course of operating a motor vehicle, a motorist must be constantly aware of the manner in which other motorists are operating their vehicles. In the case of a motorist following another motor vehicle, the following motorist must be careful to maintain a safe stopping distance between his vehicle and the vehicle which he is following. It has therefore been the general practice to equip all motor vehicles with brake lights that are visible to following motorists, and are automatically energized whenever the vehicle on which they are mounted is being braked.

It is common to utilize a red light mounted on the rear of a motor vehicle. This red light is activated immediately upon initial activation of the motor vehicle brake. The intensity of the red light is constant and also the red light is activated during the entire time the brake is applied. A following driver is unable to ascertain whether the vehicle is merely slowing down or is making a fast emergency stop.

In the past, various systems have been proposed to indicate to following motorists that a vehicle is being decelerated at a unusually rapid rate. For example, a system has been proposed to indicate the normal braking of the vehicle by energization of the normal vehicle brake lamps and then to further indicate abnormal hard braking of the vehicle by energization of additional brake lamps to give an increased warning to following motorists. This additional information, provided by such a prior system, is no doubt of value. However, the disadvantages of these systems have prevented their gaining widespread acceptance. Probably the most significant reason that these systems have not gained widespread acceptance is that they have been far too complex in construction and also confusing to many motorists in their application.

SUMMARY OF THE INVENTION

The primary objective of the present invention is to provide a brake light signal system for a motor vehicle which activates an increasing number of different colored brake lamps proportional to the amount of deceleration force that is being experienced by the motor vehicle.

Another objective of the present invention is to construct a motor vehicle brake light signal system which can be manufactured inexpensively and, therefore, sold to the ultimate consumer at an inexpensive price, thereby making the structure of the present invention economically available to most people.

It is another objective of this invention to have the motor vehicle brake light signal system not respond to gradient on which the car moves or the attitude of the vehicle due to difference in suspension between the front and rear of the car.

The brake light signal system of the present invention utilizes an annunciator in the form of a plurality of different colored lights which are to be mounted on the rear portion of a vehicle. These lights are connected through electrical circuitry to be activatable during normal operation of the brake system of the vehicle. The conventional red tail light of a motor vehicle will be normally lit when the brake is initially applied within the vehicle. As the motor vehicle begins to initially slow, a mercury switch causes closing of a first circuit which will activate a further light, such as a green light. An increased level in deceleration will result in a second mercury switch closing causing activation of a still further different colored light, such as a yellow light. Yet still further deceleration of the vehicle will cause a third mercury switch to activate a third circuit which in turn will activate an additional colored light, such as a blue light. As each additional light is activated, the previously activated light may either remain on or may be turned off, depending upon the type of circuitry utilized. The brake light signal system is mounted within a housing with this housing in turn supported about a pair of parallel, spaced-apart, pivot axes relative to the motor vehicle. As the motor vehicle assumes different angles of inclination, such as what normally occurs as the motor vehicle is driven up and down hills, the housing will automatically adjust to remain in a horizontal position so that the mercury switches will only be sensitive to deceleration and not to changing of angles of inclination of the vehicle. The force that causes the housing to assume a different inclination would also occur during deceleration on a plane surface. However, a damping mechanism prevents such an adjustment long enough for the mercury switches to latch the lamps.

BRIEF DESCRIPTION OF THE DRAWINGS

FIG. 1 is a elevational view of the rear portion of a motor vehicle within which has been installed the brake light signal system of the present invention;

FIG. 2a is a front elevational view of the annunciator utilized in accordance with the brake light signal system of the present invention;

FIG. 2b is a wiring diagram, showing the electrical circuitry utilized to operate the annunciator in FIG. 2a;

FIG. 3a is a front elevational view of a modified form of annunciator of the brake light signal system of the present invention;

FIG. 3b is a wiring diagram, showing the electrical circuitry utilized to operate the annunciator in FIG. 3a; and FIG. 4 is an isometric view, showing the mounting of the brake light signal system of the present invention within the motor vehicle.

DETAILED DESCRIPTION OF THE SHOWN EMBODIMENT

Referring particularly to the drawings, there is shown in FIG. 1, a typical motor vehicle 10 which has a right rear wheel 12, and a right frong wheel 14 and a rear bumper 16. Associated alongside the rear bumper 16 is a conventional taillight system 18. Within the taillight system 18 there is a conventional red light which is to be activated by depressing of the brake pedal within the motor vehicle 10. Along with the activating of this red brake light within the taillight system 18 there is an additional red light 20 which is activated within an annunciator 22. This annunciator 22 is shown mounted within the rear window 24 of the vehicle 10. It is to be understood that the red light 20 is really a white light bulb that is covered by a red colored lens.

Depressing of the brake pedal within the motor vehicle 10 closes brake pedal switch 26. This causes the conducting of a positive twelve volts to conductor 28 with respect to ground line 29. Closing of brake switch 26 immediately activates the red light 20.

As the motor vehicle 10 begins to decelerate, the mercury switch 30 will at some time close. The longitudinal axis of the mercury switch 30 is displaced a small angle from horizontal such as fifteen degrees. Closing of the switch 30 results in activation of relay coil 32. Coil 32 causes simultaneous closing of by-pass switch 34 and light switch 36. Upon light switch 36 closing, the different colored light 38 is activated which will be of a color such as green. Light 38 is mounted directly adjacent light 20 on the annunciator 22.

The reason for the by-pass switch 34 is that, if the mercury switch 30 momentarily closes and then reopens, normally the coil 32 would be deactivated and the switches 34 and 36 would be opened. It is desirable that once the mercury switch 30 closes, if only momentarily, the light 38 will be lit and will remain "on" until the brake light switch 26 is opened. Opening of the brake light switch 26 will automatically reset the entire circuit. Therefore, once the mercury switch 30 is closed, switch 34 is then closed which by-passes the mercury switch 30. Therefore, the coil 32 will remain activated regardless of the position of the mercury switch 30 until the brake light switch 26 is opened.

Basically the electrical circuitry composed of mercury switch 30, coil 32, switches 34 and 36, and light 38 is duplicated two additional times within the remaining portion of the circuit shown within FIG. 2b. Further deceleration of the vehicle 10 will result in mercury switch 40 closing. This will activate the relay coil 42 which in turn will simultaneously close the by-pass switch 44 and the light switch 46. Light switch 46 will activate an additional light 48 which is of a different color such as yellow. Light 48 is located directly adjacent light 38 on the annunciator 22. The longitudinal axis of the mercury switch 40 is located at a slightly greater angle of inclination such as about twenty-two degrees relative to horizontal. Therefore, a greater amount of deceleration force will be required to activate the mercury switch 40 as opposed to activating the mercury switch 30.

As the vehicle 10 is further decelerated and is approaching a very severe deceleration, the mercury switch 50 will then be closed. The longitudinal axis of the mercury switch 50 is located at a still further greater angle of inclination relative to horizontal, such as approximately thirty degrees. Closing of the mercury switch 50 will cause the relay coil 52 to be activated which in turn will result in closing of the switches 54 and 56. Closing of the switch 56 will result in light 58 being lit, which is again of a different color such as blue. The light 58 is mounted directly adjacent the light 48 within the annunciator 22.

Referring particularly to FIGS. 3a and 3b of the drawings, there is shown a modified version of annunciator 60. In a similar manner, closing of brake pedal switch 62 will result in the applying of a twelve volt potential to conductor 64 with respect to the ground 66. As a result, the red lamp 68 within the annunciator 60 will be lit. It is to be noted that between the red lamp 68 and the conductor 64 there is located a normally closed switch 70.

As the vehicle 10 begins to decelerate, a mercury switch 72, which is basically similar to mercury switch 30, closes which in turn results in activation of relay coil 74 which will in turn cause switches 76 and 78 to close. Closing of switch 78 will cause light 80 to be lit. Light 80 is mounted directly adjacent the red light 68 within the annunciator 60.

However, upon activation of coil 74 the normally closed switch 70 is opened. This means that the red light 68 is turned "off" so that only the yellow light 80 is on. Within the circuitry previously described in relation to FIG. 2b, when the green light 38 is "on" also is the red light 20. Similarly, when light 58 was lit, also lights 20, 38 and 48 were lit. This is not true within FIG. 3b with only one light being lit at any given time.

Further deceleration of vehicle 10 will then cause mercury switch 82 to close which will activate coil 84. Activation of coil 84 closes by-pass switch 86 and light switch 88. Closing of the light switch 88 will cause the panic light 90 to be lit which would be a color such as blue.

However, coil 84 causes normally closed switch 92 to open which will result in light 80 being turned "off". Therefore, at this time only the blue panic light 90 is lit.

The circuitry of either FIG. 2b or FIG. 3b is to be mounted on a planar base 94. The different angles of inclination of the mercury switches are specifically oriented at their precise angles on the base 94. The base 94 would normally be enclosed by a housing 96.

Appropriate holes are formed within the housing 96 on each side thereof with one hole connecting with bracket 98 and the opposite hole connecting with bracket 100. Bracket 98 is pivotable about pivot axis 102 with respect to the housing 96. Also, bracket 100 is pivotable about the pivot axis 102.

The free end of the bracket 98 is pivotally mounted (as by a rivet, not shown) about a pivot axis 104 to an arm 206. Arm 206 is fixedly secured to a portion of the motor vehicle 10. A common place for mounting of the housing 96 would be within the trunk of the motor vehicle. In a similar manner, the free end of the bracket 100 is pivotally mounted (as by a rivet, not shown) about pivot axis 104 to an arm 207. Arm 207 is also fixedly secured to a portion of the motor vehicle 10. The pivot axis 102 and the pivot axis 104 are located parallel to each other.

It is important to the mounting of the housing 96 that the axes 102 and 104 are located perpendicular or transverse to the normal forward direction of the vehicle 10. The center of gravity 106 of the housing 96 is located below the axis 102 so that there is a greater distance from the center of gravity 106 to axis 104 than the distance to axis 102. Basically, the housing 96 is free to swing in a direction parallel to the direction of movement of the vehicle 10. Upon the vehicle 10 climbing a hill and, therefore, assuming an upward inclined position, the housing 96 will pivot slightly toward the rear of the vehicle 10 with the housing 96 also slightly pivoting in a counterclockwise direction relative to the brackets 98 and 100. The base 94 is maintained horizontal. Therefore, the position of the mercury switches mounted on the base 94 are not affected by the motor vehicle 10 assuming different angles of inclination.

When the vehicle begins to go down a hill, the reverse is true with the housing 96 pivoting to assume a position nearer the forward section of the motor vehicle 10 and also pivoting slightly clockwise relative to the brackets 98 and 100. It is true that decelerating of the vehicle by the application of the brakes will begin to cause the housing 96 to move to a similar position. However, this movement of the housing 96 is a lot slower in time when compared to the response time for each of the mercury switches. Therefore, the mercury switches will be activated upon application of the brake before the housing 96 has a chance to assume its pivoted position which would maintain the base 94 horizontal. The closer the center of gravity 106 to the pivot axis 102, the quicker the response of the movement of the housing 96. Therefore, the spacing of the center of gravity 106 to axis 102 is chosen so the response of the housing 96 will be substantially slower than the response of the mercury switches but still will react to changes in inclination of the vehicle 10.

To further insure that the housing 96 moves slower than the braking, housing 96 has attached thereto a rod 208. Rod 208 is capable of freely pivoting relative to housing 96 as depicted by arrow 205. Rod 208 is fixed to cylinder 204. Piston 209 is slidably mounted within cylinder 208. Piston 209 and cylinder 204 function as an air damper. Piston 209 is attached to piston rod 203. Piston rod 203 is pivotally mounted by screw 202 to hole 201 of arm 206.

The function of this damper is to resist any sudden movement. The axis of screw 202 is displaced from axis 104. Also, the axis of rod 208 is displaced from axis 102. This displacement permits the piston 209 and cylinder 204 to damp the movement around both axis 104 and axis 102. If screw 202 was mounted on axis 104 and rod 208 mounted on axis 102, the damper would not function as intended.

The shape of the annunciators 22 and 60 could be selected to achieve optimum attention of the following motorists. For example, a pyramid shape may be desired.

Each of the mercury switches 30, 40, 50, 72 and 82 includes a bubble 39 of mercury. Each bubble 39 is confined within its respective tubular housing of the mercury switch to only move in the direction along the longitudinal axis of the mercury switch. Each longitudinal axis is oriented to align with the direction of normal forward straight-line movement of the motor vehicle 10.

The combination herein is blind to situations when the car is decelerating mildly on a level surface. In such a situation only the first lamp activates. This lamp represents all mild deceleration forces. Any deceleration that is less than the force required to activate the second mercury switch is deemed mild.

What is claimed is:

1. In combination with a motor vehicle, said motor vehicle having a braking system, a brake light signal system connected to said motor vehicle, said brake light signal system being activated upon actuation of said braking system, said brake light signal system comprising:
   a plurality of lights, each said light being visually distinctive from each other;
   electrical circuitry for activating each of said lights, said circuitry including a first inertially sensitive switch in series with a first coil, a first by-pass switch connected in parallel with said first inertial sensitive switch, said first coil being activated upon closing of said first inertially sensitive switch, activation of said first coil closes said first by-pass switch electrically by-passing said first inertial sensitive switch; and
   a first light switch, closing of said first light switch activates one of said lights, said first light switch being closed by said first coil.

2. The combination as defined in claim 1 including:
   a second inertially sensitive switch in series with a second coil a second by-pass switch connected in parallel with said second inertial sensitive switch, said second coil being activated upon closing of said second inertial sensitive switch, activation of said second coil closes said second by-pass switch; and
   a second light switch, closing of said second light switch activates another of said lights, said second light switch being closed by said second coil.

3. The combination as defined in claim 2 including:
   a third inertially sensitive switch in series with a third coil a third by-pass switch connected in parallel with said third inertial sensitive switch, said third coil being activated upon closing of said third inertial sensitive switch, activation of said third coil closes said third by-pass switch; and
   a third light switch, closing of said third light switch activates another of said lights, said third light switch being closed by said third coil.

4. The combination as defined in claim 2 including: a normally closed switch in series with said first coil, activation of said second coil causes opening of said normally closed switch which results in deactivation of its respective said light.

5. The combination as defined in claim 3 wherein: each said inertially sensitive switch comprising a mercury switch, each said mercury switch being oriented in a different inclination angle in respect to each other, whereby each said mercury switch being activated at a different amount of motor vehicle braking force.

6. The combination as defined in claim 1 wherein: said distinctive means for each said light comprising a different color.

7. The combination as defined in claim 1 including: a planar base, said brake light signal system being mounted on said planar base, a supporting bracket assembly mounted on said motor vehicle, said planar base being mounted on said supporting bracket assembly, said planar base being mounted about a first pivot axis on said bracket assembly, said bracket assembly being mounted about a second pivot axis on said motor vehicle, whereby as said motor vehicle assumes different angular positions as it is operated said planar base is to remain substantially horizontal.

8. The combination as defined in claim 7 wherein: said motor vehicle having a normal forward straight-line direction of movement, said second pivot axis being located parallel to said first pivot axis, said first and second pivot axes being located perpendicular to said direction of movement, whereby said brake light signal system is only sensitive to inertia along said direction of movement and not sensitive to turning movement of said motor vehicle.

9. The combination as defined in claim 8 wherein: said first inertially sensitive switch comprising a tubular mercury switch, said tubular mercury switch having a mercury bubble, said tubular mercury switch having a longitudinal axis along which said bubble is confined to move, said longitudinal axis coinciding with said direction of movement.

10. The combination as defined in claim 9 wherein: the braking force of said braking system being capable of causing said mercury bubble to move along said longitudinal axis and activate said tubular mercury switch, said planar base being subject to pivoting about said first and second pivot axes upon applying of the braking force, said brake light signal system including means causing said tubular mercury switch to be substantially more sensitive to the braking force than said planar base, whereby said lights are activated before said planar base is able to pivot to adjust to the braking force.

11. The combination as defined in claim 10 wherein: said means comprising a damper.

12. The combination as defined in claim 5 including: a planar base, said brake light signal system being mounted on said planar base, a supporting bracket assembly mounted on said motor vehicle, said planar base being mounted on said supporting bracket assembly, said planar base being mounted about a first pivot axis on said bracket assembly, said bracket assembly being mounted about a second pivot axis on said motor vehicle, whereby as said motor vehicle assumes different angular positions as it is operated said planar base is to remain substantially horizontal.

13. The combination as defined in claim 12 wherein: said motor vehicle having a normal forward straight-line direction of movement, said second pivot axis being located parallel to said first pivot axis, said first and second pivot axes being located perpendicular to said direction of movement, whereby said brake light signal system is only sensitive to inertia along said direction of movement and not sensitive to turning movement of said motor vehicle.

14. The combination as defined in claim 13 wherein: each said inertially sensitive switch comprising a tubular mercury switch, each said tubular mercury switch being separated from each other, thereby each said mercury switch being unaffected by each other's operation.

15. The combination as defined in claim 14 wherein: each said mercury switch having a mercury bubble, each said mercury switch having a longitudinal axis along which said bubble is confined to move, each said longitudinal axis coinciding with said direction of movement.

16. The combination as defined in claim 15 wherein: the braking force of said braking system being capable of causing each said mercury bubble to move along said longitudinal axis and activate its resepective said tubular mercury switch, said planar base being subject to pivoting about said first and second pivot axes upon applying of the braking force, said brake light signal system including means causing each said tubular mercury switch to be substantially more sensitive to the braking force than said planar base, whereby said lights are activated before said planar base is able to pivot to adjust to the braking force.

17. The combination as defined in claim 16 wherein: said means comprising a damper.

* * * * *